United States Patent [19]

Schneider et al.

[11] Patent Number: 5,778,543
[45] Date of Patent: Jul. 14, 1998

[54] INERTIAL SENSOR UNIT

[75] Inventors: Alfred Schneider, Überlingen; Gotz Geister, Frickingen, both of Germany

[73] Assignee: Bodenseewerk Geratetechnik GmbH, Uberlingen/Bodensee, Germany

[21] Appl. No.: 848,407

[22] Filed: May 8, 1997

Related U.S. Application Data

[63] Continuation of Ser. No. 797,162, Feb. 10, 1997, abandoned.

[30] Foreign Application Priority Data

Feb. 13, 1996 [DE] Germany .................. 296 02 453 U

[51] Int. Cl.[6] .................................................. G01C 19/38
[52] U.S. Cl. .................................................. 33/324; 33/318
[58] Field of Search .............................. 33/324, 318, 321, 33/323, 326

[56] References Cited

U.S. PATENT DOCUMENTS

| | | | |
|---|---|---|---|
| 3,898,744 | 8/1975 | Johnston | 33/324 |
| 5,060,392 | 10/1991 | Grasso | 33/324 |
| 5,187,870 | 2/1993 | Abe et al. | 33/324 |
| 5,416,976 | 5/1995 | Hane et al. | 33/324 |
| 5,566,461 | 10/1996 | Wick et al. | 33/324 |

Primary Examiner—Christopher W. Fulton
Attorney, Agent, or Firm—McDermott, Will & Emery

[57] ABSTRACT

An inertial sensor unit for determining north, has a housing and a positioning gimbal rotatably mounted in this housing about a substantially vertical axis. A releasable, cooperating detent mechanism defines three fixed angular detent positions of the positioning gimbal about the substantially vertical axis relative to the housing. The positioning gimbal is successively rotated into the three detent positions. A fiber optical gyro is mounted on the positioning gimbal. The input axis forms an acute angle with a substantially horizontal axis orthogonal to the above mentioned substantially vertical axis. A signal processing system is provided, to which the signals generated by the fiber optical gyro in the three detent positions are applied. The signal processing system provides, therefrom, the angle between a reference direction and north.

13 Claims, 5 Drawing Sheets

5,778,543

1
INERTIAL SENSOR UNIT

This application is a continuation of application Ser. No. 08/797,162, filed Feb. 10, 1997, now abandoned and the benefits of 35 USC 120 are hereby claimed.

TECHNICAL FIELD

The invention relates to an inertial sensor unit with an inertial sensor of the type using the Sagnac effect. The inertial sensor is rotatable about a substantially vertical axis to a plurality of fixed positions. Signal processing means receive the signals from the inertial sensor means in the various fixed positions and provide, therefrom, a measured value indicative of the angle between a reference direction and north.

BACKGROUND ART

Such an inertial sensor unit is, for example, known from U.S. Pat. No. 5,060,392. In this prior art inertial sensor unit, the inertial sensor is a ring laser gyro. The rotary movements of a gimbal carrying the gyro are measured by the gyro itself. Accelerometers are mounted on the gimbal.

DISCLOSURE OF THE INVENTION

It is the object of the invention to provide a simple, compact and inexpensive inertial sensor unit.

According to the broad concept of the invention, the inertial sensor unit for determining north, comprises a housing and a positioning gimbal rotatably mounted in this housing about a substantially vertical axis. Releasable, cooperating detent means are provided at the housing and at the positioning gimbal for defining three fixed angular detent positions of the positioning gimbal about the substantially vertical axis relative to the housing. Adjusting means successively rotate the positioning gimbal about the substantially vertical axis into the three detent positions. A fiber optical gyro comprises a fiber coil of light-guiding fibers wound around an input axis, coherent light source means and means for directing light from said light source means partially clockwise and partially counter-clockwise through the coil as first and second partial waves, respectively, interference means for causing interference of the first and second partial waves after propagating through the fiber coil, and detector means for detecting the interfering partial waves to generate a signal indicative of inertial angular rate of the coil about the input axis. The fiber optical gyro is mounted on the positioning gimbal. In the preferred embodiment, the input axis forms an acute angle with a substantially horizontal axis orthogonal to the above mentioned substantially vertical axis. signal processing means are provided, to which the signals indicative of inertial angular rate generated by the fiber optical gyro in the three detent positions are applied. In addition, two inclination sensors such as accelerometers with mutually crossed sensitive axes are provided on the housing. The signal processing means provide, from the fiber optical gyro signals and the inclination sensor signals, a measured value indicative of the angle between a reference direction and north and of gyro drift.

According to the invention, a fiber optical gyro is used as inertial sensor instead of a ring laser gyro. This is a coil of light-guiding fiber, into which light ,for example of a laser diode, is directed once clockwise and once counter-clockwise. The two partial beams are brought to interference, after they have passed through the fiber coil.

2

Because of the Sagnac effect, the optical path lengths for the clockwise and the counter-clockwise partial beams are different, is the fiber coil experiences an angular rate about its axis. Thus the interference which can be measured is dependent on this angular rate. Such fiber optical gyros, known per se, are simpler and less expensive than ring laser gyros. It has been found that their sensitivity is sufficient for the present purposes. Such fiber optical gyros exhibit, however, a drift.

The fiber optical gyro is used to measure components of the angular rate of the earth. If the input axis of the fiber optical gyro is inclined with respect to the horizontal by, for example, 45°, the output signal is influenced not only by the horizontal component of the angular rate of the earth but also by the vertical component of the angular rate of the earth.

The measurement is carried out in three positions. In these positions, the angular rates effective about the measuring axis of the fiber optical gyro and caused by the angular rate of the earth are measured. These angular rated depend on trigonometric functions of the attitude angles, i.e. the pitch, roll and azimuth angles (angle between reference axis and North). The measurements in the three positions provide three equations. It is, however, not possible to unambiguosly determine the quadrant of the azimuth angle. Furthermore, the drift is unknown. By measuring the pitch and roll angles, three equations are obtained for azimuth angle, quadrant of the azimuth angle (in the form of sine and cosine of the azimuth angle) and drift.

With the inertial sensor unit of the invention, the different positions for the measurements are defined by detent means. This is simple and very accurate.

Further objects and modifications of the invention will be apparent to those skilled in the art from the following description of a preferred embodiment of the invention. Such an embodiment is described with reference to the accompanying drawings:

PREFERRED EMBODIMENT OF THE INVENTION

Figure 1:
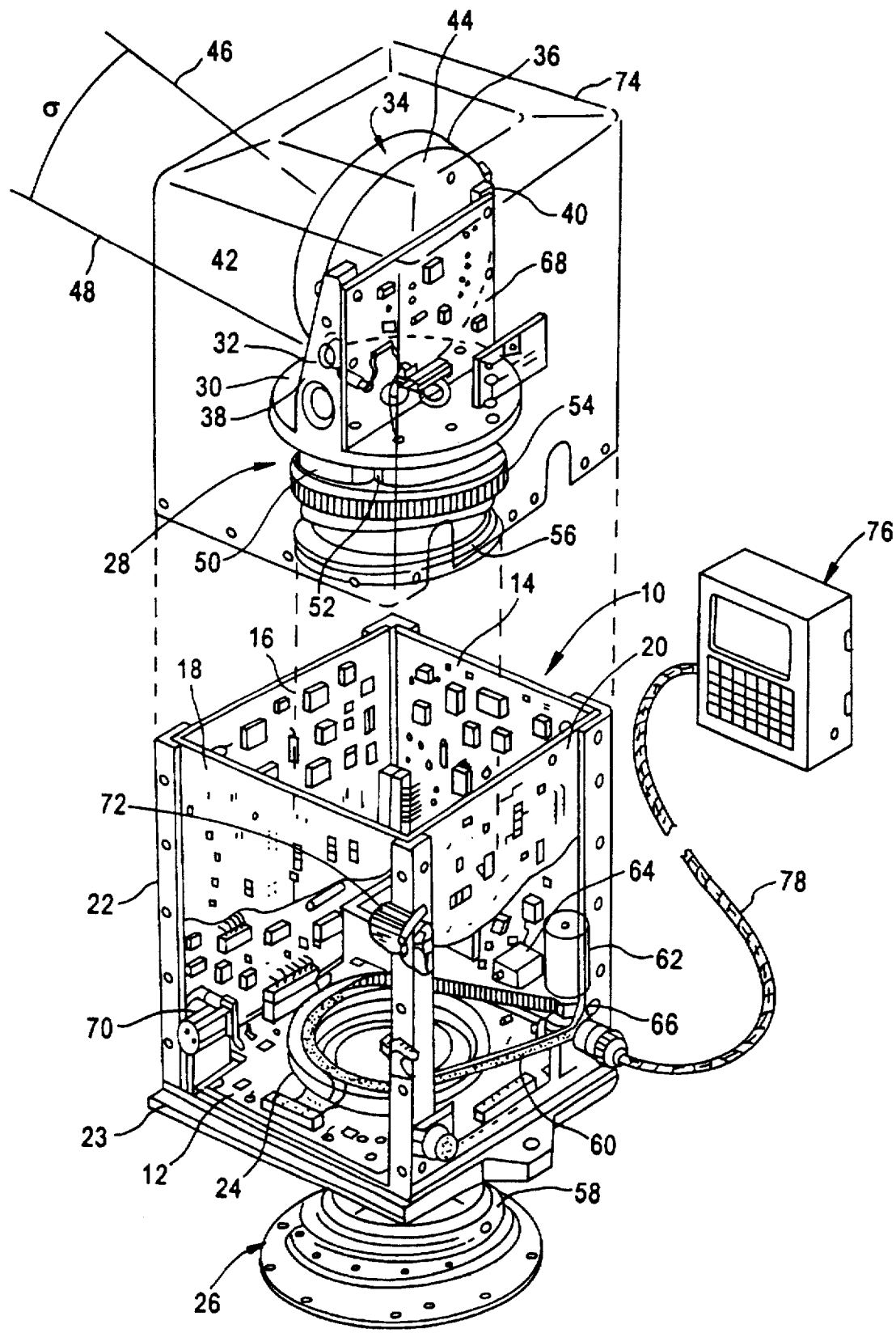
FIG. 1 is an exploded, perspective view of an inertial sensor unit with an inertal sensor in the Form of a fiber optical gyro.

The inertial sensor unit has a rectangular inner housing 10. The inner housing 10 is constructed from five printed circuit boards 12, 14, 16, 18 and 20. The printed circuit board 12 is substantially square and forms the bottom of the inner housing 10. The rectangular printed circuit boards 14, 16, 18 and 20 represent the side walls of the inner housing 10. The inner housing 10 is open at the top. The printed circuit boards are supported in a framework 22 of L-shaped brackets and a base plate 23. The printed circuit board 12 forming the bottom of the inner housing 10 and the base plate 23 have aligned central, circular apertures 24. A bearing assembly 26 for a positioning gimbal 28 extends through this apertures 24. In the exploded illustration of FIG. 1. the bearing assembly 26 is illustrated as pulled downwards out of the aperture.

In the exploded perspective view of FIG. 1. the positioning gimbal 28 is illustrated pulled upwards out of the inner housing 10. Actually, the positioning gimbal 28 is mounted for rotation about the substantially vertival axis in the bearing assembly 26 and is located within the inner housing.

The positioning gimbal 28 includes a circular platform 30 with a holder 32 for holding a fiber optical gyro 34. The fiber optical gyro 34 contains a flat-cylindrical coil (not visible in FIG. 1) in a correspondingly flat-cylindrical housing 36. The holder 32 has two arms 38 and 40 projecting upwardly from the platform 30. The arms 38 and 40 have two inclined planes lying in one plane which is inclined with respect to the vertical. The rear wall 44 of the flat-cylindrical housing 36 engages these inclined surfaces 42. The axis of the coil of light-guiding fibers is designated by 46. The axis 46 forms an angle θ with a substantially horizontal axis 48 orthogonal to the substantially vertical axis.

A positioning ring 50 is attached to the positioning gimbal below the circular platform 30 and coaxial therewith. The positioning ring has three v-shaped notches 52, which are angularly spaced from each other by 90°. Only one of the notches 52 is visible in FIG. 1. A gear wheel 54 is provided on the positioning gimbal 28 below the positioning ring 50 and coaxial therewith. A bearing element 56 for rotatably mounting the positioning gimbal 28 is provided below the gear wheel 54. The bearing assembly 26 has a corresponding rotary bearing 58.

The positioning gimbal 28 thus arranged within the inner housing 10 and mounted for rotation through bearing element 56 and rotary bearing 58 is coupled with a servomotor 62 through a toothed belt 60. The servomotor 62 is attached to the printed circuit board 14. The toothed belt extends around the gear wheel 54. The servomotor 62 is able to rotate the positioning gimbal 28 into three different positions mutually angularly offset by 90°. The positioning gimbal 28 is mechanically retained. This is done by a controllable detent pin unit 64 with a detent pin 66, which engages one of the three v-shaped notches 52, angularly spaced by 90°, of the positioning ring 50. It is, of course, also possible to provide only one notch 52 in the positioning ring 50, which cooperates with three detent pin units mutually angularly offset by 90°. Thanks to the v-shape of the notches 52, the positions of the positioning gimbal 28 can be fixed with high accuracy.

The components of the signal processing electronic system are mounted on the printed circuit boards 12, 14, 16, 18 and 20. Further components are mounted on a printed circuit board 68 behind the fiber optical gyro, the printed circuit board 68 being attached to the arms 38 and 40 on the side thereof remote from the inclined surfaces 42.

The printed circuit board 18 carries an accelerometer 70. The sensitive axis of the accelerometer 70 extends normal to the printed circuit board 18. The printed circuit board 20 carries an accelerometer 72. The sensitive axis of the accelerometer extends normal to the printed circuit board 20 and extends, therefore, crosswise to the sensitive axis of the accelerometer 70.

The inner housing 10 is covered by an outer housing 74 open at the bottom.

A separate indicating and operator unit 76 is connected with the remaining instrument through a cable.

Figure 2:
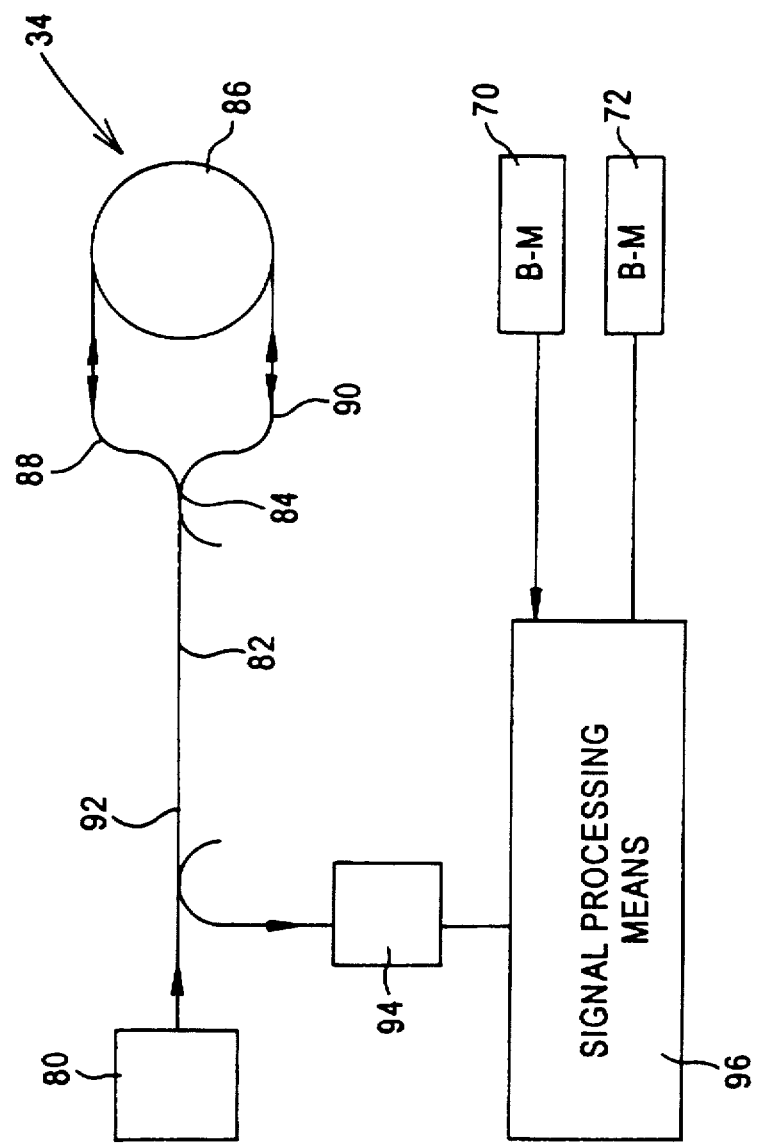
FIG. 2 shows schematically the well-known set-up of a fiber optical gyro and, as blocks, the accelerometers and the signal processing system.

Referring now to FIG. 2, numeral 80 designates a polarized light source. The light from the light source 80 is coupled into the flat-cylindrical coil 86 of the fiber optical gyro (FOG) 34 through a light guiding fiber 82 and a coupler 84 to propagate through the coil 86 counter-clockwise, in one partial beam, and clockwise, in another partial beam. In FIG. 2, the coil 86 is shown as a circle. The coil 86 has two ends 88 and 90. The light propagating clockwise through the coil 86 is coupled into the end 88. The light propagating counter-clockwise through the coil 86 is coupled into the end 90. The light beam propagating clockwise through the coil 86 emerges from the end 90 and is coupled by the coupler 84 into the light guiding fiber 82, now propagating from the right to the left in FIG. 2. Correspondingly, the light beam propagating counter-clockwise through the coil emerges at the end 88 and is coupled into the light guiding fiber 82 -again propagating from the right to the left in FIG. 2. The two light beams interfere with each other. The interfering light beams are directed to a photoelectric detector 94 by a second coupler 92.

If the coil 85 experiences an angular rate about its axis 46 relative to inertial space, then the optical path lengths for the clockwise and the counter-clockwise propagating light are changed due to the Sagnac effect. Correspondingly, the interference of the two light beams and signal provided by the detector 94 are changed. The fiber optical gyro 34 provides a signal indicative of the angular rate about the axis 46 of the coil 86. This is a technology well known to a person skilled in the art and, therefore, is not described in detail here.

The angular rate signal of the fiber optical gyro 34 thus obtained is applied to signal processing means 96. Furthermore, the signal processing means 96 receive acceleration signals from the two housing-fixed accelerometers 70 and 72.

Figure 3:
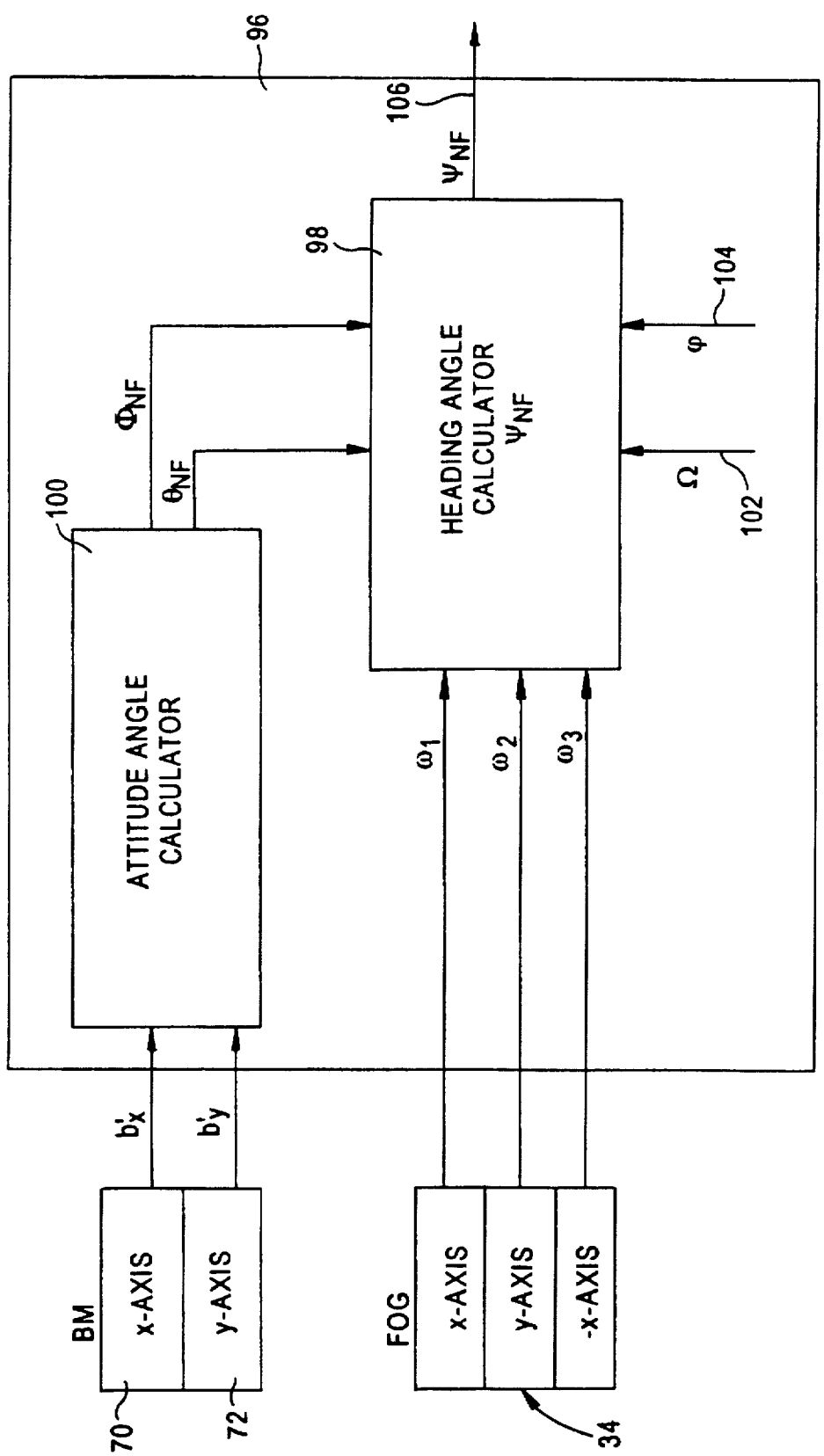
FIG. 3 is a block diagram of the signal processing system.

FIG. 3 is a block diagram of the signal processing means 96 for determining the heading or azimuth angle $\Psi_{NF}$, i.e. the angle between the longitudinal axis of the vehicle, or a reference axis of the housing, and north.

The sensors are the two accelerometers 70 and 72 and the fiber optical gyro (FOG) 34. In the three positions of 0°, 90° and 180° of the positioning gimbal, the fiber optical gyro 34 provides three angular rates about the x-axis, the y-axis and the "-x"-axis. These three angular rates are applied to means for computing the heading angle. These means are represented by a block 98 in FIG. 3. The signals from the two accelerometers are applied to a block 100 which computes, therefrom, the attitude angles $\Phi_{NF}$ and $\Theta_{NF}$. These attitude angles $\Phi_{NF}$ and $\Theta_{NF}$ are also applied to the block 98. For computing the heading angle, the block 98, in addition, receives the angular rate of the earth $\Omega$ and latitude $\phi$ at inputs 102 and 104, respectively.

The determination of the heading angle relative to north is based on the principle of evaluating the components of the horizontal component of the angular rate of the earth in the directions of the longitudinal and transverse axes of the vehicle.

Figure 4:
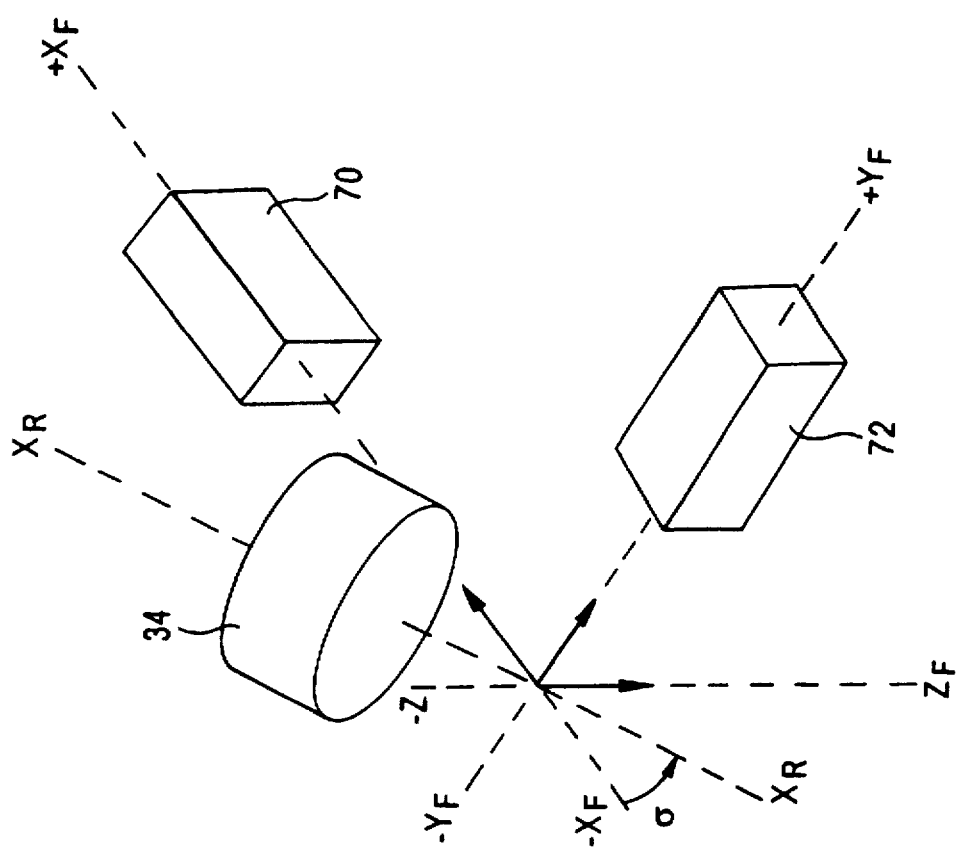
FIG. 4 is a schematic illustration of the sensor system.
Figure 5:
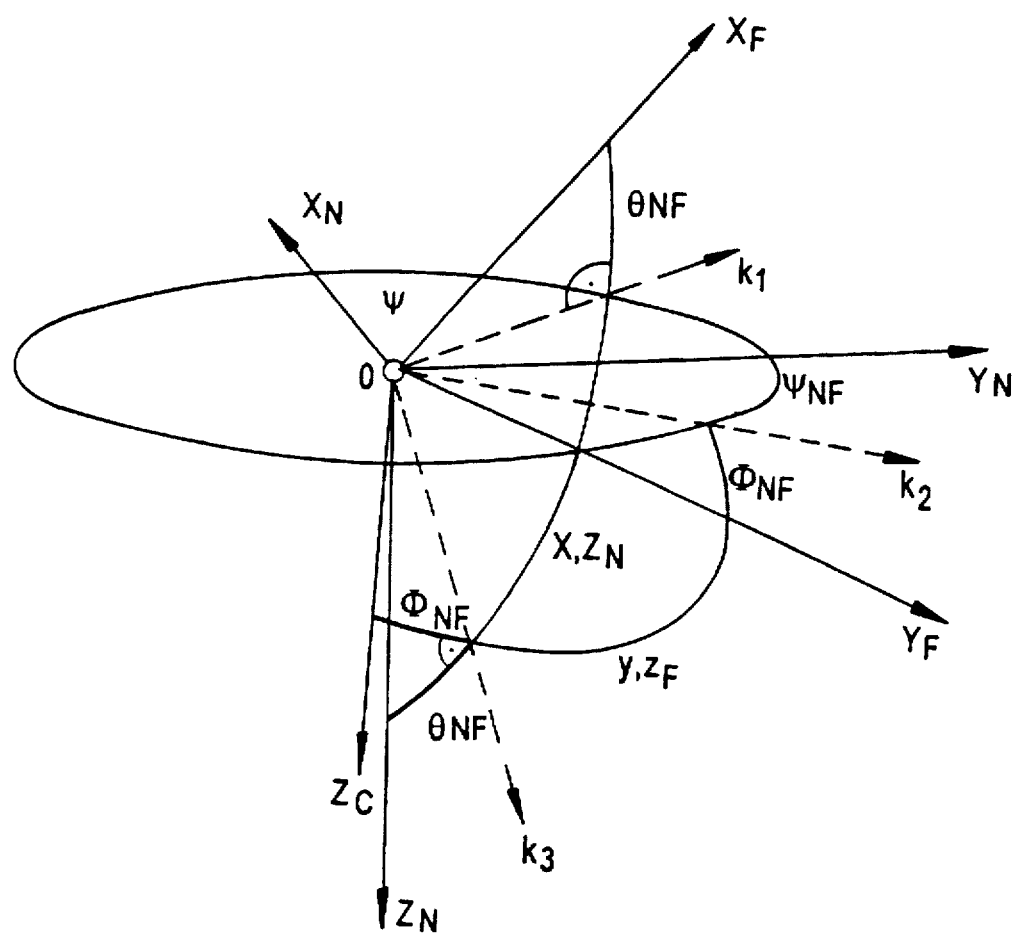
FIG. 5 shows the relative positions of vehicle-fixed and navigation coordinate systems and the Euler angles occurring therein.

FIG. 4 is a schematic illustration of the arrangement of the sensors relative to the vehicle-fixed coordinate system. The positioning gimbal is in its 0°-position. The sensor system is aligned with the vehicle-fixed axes $X_F$ and $Y_F$. The substantially vertical axis $Z_F$ extends orthogonal to the two axes $X_F$ and $Y_F$. The sensitive axes of the two accelerometers 70 and 72 are parallel to the axes $X_F$ and $Y_F$. The fiber optical gyro 34 with the coil 86 is mounted on the positioning gimbal 28. The measuring axis 46 ($X_B$) of the fiber optical gyro 34, i.e. the axis of the coil 84 lies in a plane normal to the axus $Y_F$ and is inclined with respect to the $X_F$-$Y_F$-plane by an elevation angle σ.

The pitch angle of the vehicle and housing will be designated $\Theta_{F/N}$ hereinbelow. The roll angle will be designated $\Phi_{F/N}$ and the azimuth angle will be designated $\Psi_{F/N}$. The three components of the angular rate $\Omega$ of the earth in the directions of the axes $X_F$, $Y_F$ and $Z_F$ of the vehicle-fixed coordinate system and measured in this coordinate system will then be:

$$\omega_x = \Omega_c \cos \Theta_{F/N} \cos \Psi_{F/N} + \Omega_s \sin \Theta_{F/N}$$

$$\omega_y = \Omega_c(\sin \Phi_{F/N} \sin \Theta_{F/N} \cos \Psi_{F/N} - \cos \Phi_{F/N} \sin \Psi_{F/N}) - \Omega_s \sin \Phi_{F/N} \cos \Theta_{F/N}$$

$$\omega_z = \Omega_c(\cos \Phi_{F/N} \sin \Theta_{F/N} \cos \Omega_{F/N} + \sin \Phi_{F/N} \sin \Omega_{F/N}) - \Omega_s \cos \Phi_{F/N} \cos \Theta_{F/N}$$

With the fiber optical gyro 34 inclined by the angle $\sigma$ relative to the $X_F Y_F$-plane, the following signals are obtained in the three positions of the positioning gimbal:

$$\omega_1 = \cos \sigma \omega_x - \sin \sigma \omega_z + d + \omega_{disturbing\ motion}$$

$$\omega_2 = \cos \sigma \omega_y - \sin \sigma \omega_s + d + \omega_{disturbing\ motion}$$

$$\omega_3 = -\cos \sigma \omega_x - \sin \sigma \omega_z + d + \omega_{disturbing\ motion}$$

Therein, d is the drift of the fiber optical gyro, $\omega_{disturbing\ motion}$ is the disturbing angular rate which is caused by motions of the vehicle during the north finding, for example by angular oscillations due to a running motor or by foundering movements on soft ground. The disturbing motions can be estimated on the basis of the attitude angles and their time dreivatives, and can be subtracted from the measuring signals.

The angles of inclination $\Theta_{F/N}$ and $\Phi_{F/N}$ are measured by means of the accelerometers 70 and 72, respectively. This yields a system of three equations with three unknown quantities, from which the three parameters $\cos \Psi_{F/N}$ and $\sin \Psi_{F/N}$ can be determined. The two values of $\cos \Omega_{F/N}$ and $\sin \Psi_{F/N}$ determine the quadrant of the azimuth angle $\Omega_{F/N}$.

The signal processing means are programed to carry out the computations given above.

The inclination of the axis 46 of the fiber optical gyro 34 has the consequence that the fiber optical gyro responds also to angular rates about the substantially vertical axis $Z_F$ of the vehicle. Thereby, the signal of the fiber optical gyro 34 in combination with the inclination signals from the accelerometers 70 and 72 can also be used, after the heading angle $\Psi_{NF}$ has been determined in the way described above, to determine the time derivative $\dot{\Psi}_{NF}$ of the heading angle and, therefrom by integration, the changes of the heading angle determined, at first, with respect to north.

If only the azimuth angle to North is to be determined, the elevation angle $\sigma$ may be zero.

We claim:

1. An inertial sensor unit, comprising a housing; a positioning gimbal rotatably mounted in said housing about a substantially vertical axis; releasable, cooperating detent means at said housing and at said positioning gimbal for defining a number of fixed angular detent positions of said positioning gimbal about said axis relative to said housing; adjusting means for consecutively rotating said positioning gimbal about said axis into said detent positions; a fiber optical gyro comprising: a fiber coil of light-guiding fibers wound around an input axis, light source means and means for directing light from said light source means partially clockwise and partially counter-clockwise through said coil as first and second partial waves, respectively, interference means for causing interference of said first and second partial waves after propagating through said fiber coil, and detector means for detecting said interfering partial waves to generate a signal indicative of inertial angular rate of said coil about said input axis; said fiber optical gyro being mounted in said positioning gimbal; a pair of inclination sensor means having sensitive axis, said inclination sensor means being attached to said inertial sensor unit such that said sensitive axes are mutually crossed to provide inclination signals, and signal processing means, to which said signals indicative of inertial angular rate generated by said fiber optical gyro in said number of detent positions and said inclination signals from said inclination sensor means are applied, for providing, therefrom, a measured value indicative of the angle between a reference direction and north.

2. An inertial sensor unit as claimed in claim 1, wherein said input axis of said fiber optical gyro forms an acute angle with a substantially horizontal axis orthogonal to said substantially vertical axis.

3. An inertial sensor unit as claimed in claim 1, wherein said number of detent positions is three.

4. An inertial sensor unit as claimed in claim 1, wherein said inclination sensor means comprise a pair of housing-fixed accelerometers.

5. An inertial sensor unit as claimed in claim 1, wherein said housing comprises an inner housing element and an outer housing element; said inner housing element consisting of a rectangular structure of printed circuit boards and a rectangular bottom element, said bottom element projecting outwardly beyond said printed circuit boards to form a rim extending, at the bottom, around said rectangular structure, said printed circuit boards carrying electronic components of said signal processing means; said outer housing element comprising a rectangular hood open at the bottom and resting on said rim of said inner housing element.

6. An inertial sensor unit as claimed in claim 5, and further comprising bearing means extending through said bottom element into said inner housing element, said positioning gimbal being mounted for rotation in said bearing means.

7. An inertial sensor unit as claimed in claim 5, wherein said adjusting means comprise a gear wheel on said positioning gimbal, a toothed belt and an adjusting motor with a pinion, said pinion being coupled with said gear through said toothed belt.

8. An inertial sensor unit as claimed in claim 7, wherein said adjusting motor is mounted on one of the printed circuit boards.

9. An inertial sensor unit as claimed in claim 5, wherein said detent means comprise: a positioning ring attached to said positioning gimbal, said positioning ring having circumferentially spaced, v-shaped notches in its outer surface; and controlled detent pin means having a detent pin, said detent pin being arranged to engage, in said detent positions, a respective one of said notches, whereby the positioning gimbal each time adopts an accurately defined angular position.

10. An inertial sensor unit as claimed in claim 1, wherein said detent positions are angularly spaced by 90°.

11. An inertial sensor unit as claimed in claim 4, wherein said inclination sensor means comprise two mutually orthogonal accelerometers, said accelerometers being mounted on printed circuit boards of said inner housing element .

12. An inertial sensor unit as claimed in claim 1, and further comprising a display and operator unit, which is connected with the remaining sensor unit through a cable.

13. An inertial sensor unit as claimed in claim 1, wherein said signal processing means comprises means for computing, from said angular rate and inclination signals, the sine and the cosine of an attitude angle between a reference axis and North, and a sensor drift of said fiber optical gyro.

* * * * *